United States Patent [19]
Morrison

[11] Patent Number: 5,956,629
[45] Date of Patent: Sep. 21, 1999

[54] METHOD AND APPARATUS FOR TRANSMITTER IDENTIFICATION AND SELECTION FOR MOBILE INFORMATION SIGNAL SERVICES

[75] Inventor: Eric Fraser Morrison, Redwood City, Calif.

[73] Assignee: Command Audio Corporation, Redwood City, Calif.

[21] Appl. No.: 08/704,457

[22] Filed: Aug. 14, 1996

[51] Int. Cl.$^6$ .................................................. H04B 1/18
[52] U.S. Cl. ................................ 455/166.2; 455/161.2; 455/161.3; 455/186.1
[58] Field of Search ........................... 455/45, 161.1, 455/161.2, 161.3, 166.1, 166.2, 179.1, 185.1, 186.1, 186.2, 517

[56] References Cited

U.S. PATENT DOCUMENTS

| | | | |
|---|---|---|---|
| 3,718,767 | 2/1973 | Ellis | 179/15 |
| 4,247,908 | 1/1981 | Lockhart et al. | 395/325 |
| 4,266,243 | 5/1981 | Shutterly | 358/121 |
| 4,323,921 | 4/1982 | Guillou | 380/23 X |
| 4,331,837 | 5/1982 | Soumagne | 179/1 |
| 4,393,277 | 7/1983 | Besen et al. | 379/88 |
| 4,473,824 | 9/1984 | Claytor | 340/825.27 |
| 4,476,559 | 10/1984 | Brolin et al. | 370/110.1 |
| 4,608,456 | 8/1986 | Paik et al. | 179/1.5 |
| 4,677,552 | 6/1987 | Sibley, Jr. | 364/408 |
| 4,682,368 | 7/1987 | Takahashi | 455/38 |
| 4,683,586 | 7/1987 | Sakamoto et al. | 380/48 |
| 4,752,953 | 6/1988 | Paik et al. | 380/9 |
| 4,788,543 | 11/1988 | Rubin | 340/825.44 |

(List continued on next page.)

FOREIGN PATENT DOCUMENTS

| | | |
|---|---|---|
| 0128 093A1 | 12/1984 | European Pat. Off. . |
| 0 279 451 A2 | 8/1988 | European Pat. Off. . |
| 0 373 386 A2 | 6/1990 | European Pat. Off. . |
| 073 386 A2 | 6/1990 | European Pat. Off. . |

(List continued on next page.)

OTHER PUBLICATIONS

John Saunders, "Real–Time Discrimination Of Broadcast Speech/Music," Proceedings of ICASSP, IEEE, 1996, pp. 993–996.

"Macrovision Decoder/Blanker, " Elektor Electronics, vol. 14, No. 160, Oct. 1988, Canterbury, GB, pp. 44–47, XP4613.

(List continued on next page.)

Primary Examiner—Wellington Chin
Assistant Examiner—Philip J. Sobutka
Attorney, Agent, or Firm—Skjerven, Morrill, MacPherson, Franklin & Friel, LLP; Norman R. Klivans; Glen B. Choi

[57] ABSTRACT

A programming system in which entertainment and information programming is transmitted, received and stored in real time by a multitude of receivers. The stored programming subsequently may be retrieved by a user in non-real time at the user's convenience. This programming system is particularly adaptable for use with receivers located in moveable vehicles wherein, however, the mobile receivers must have access to the transmitted information, that is, to a transmitter, regardless of the extent of the vehicle's journey. To this end, one or more transmitters located within respective service areas transmit identical programming information along with respective transmitter location codes over different frequency channels, wherein each code also defines a transmitter priority of effective radiated power. As the vehicle moves within a service area, if a loss of signal occurs, the receiver selects the transmitter with the next highest priority from the transmitter location codes for that and neighboring overlapping service areas. The location codes previously are stored and periodically updated in the receiver memory. The transmitter location code may comprise a two byte word multiplexed with the information signal, wherein the first byte contains the stations or transmitter channel numbers within the respective service areas, and the second byte defines the priority of each transmitter in terms of effective radiating power.

37 Claims, 5 Drawing Sheets

U.S. PATENT DOCUMENTS

| | | | |
|---|---|---|---|
| 4,809,271 | 2/1989 | Kondo | 370/110.1 |
| 4,852,086 | 7/1989 | Eastmond et al. | 370/69.1 |
| 4,868,866 | 9/1989 | Williams, Jr. | 380/49 |
| 4,916,742 | 4/1990 | Kolesnikov et al. | 381/30 |
| 4,942,616 | 7/1990 | Linstroth et al. | 381/51 |
| 5,027,400 | 6/1991 | Baji et al. | 380/20 |
| 5,042,070 | 8/1991 | Linna et al. | 381/59 |
| 5,086,510 | 2/1992 | Guenther et al. | 455/90 |
| 5,121,391 | 6/1992 | Paneth et al. | 370/95.1 |
| 5,131,020 | 7/1992 | Liebesny et al. | 379/59 |
| 5,133,010 | 7/1992 | Borth et al. | 381/38 |
| 5,146,473 | 9/1992 | Critchlow et al. | 375/8 |
| 5,146,612 | 9/1992 | Grosjean et al. | 455/45 |
| 5,152,011 | 9/1992 | Schwob | 455/158.5 |
| 5,177,685 | 1/1993 | Davis et al. | 364/443 |
| 5,182,555 | 1/1993 | Sumner | 340/905 |
| 5,206,641 | 4/1993 | Grant et al. | 340/905 |
| 5,210,611 | 5/1993 | Yee et al. | 358/191.1 |
| 5,212,805 | 5/1993 | Comroe et al. | 455/33.1 |
| 5,233,423 | 8/1993 | Jernigan et al. | 358/181 |
| 5,239,700 | 8/1993 | Guenther et al. | 455/158.4 |
| 5,295,154 | 3/1994 | Meier et al. | 375/1 |
| 5,345,606 | 9/1994 | Duckeck et al. | 455/186.1 |
| 5,404,588 | 4/1995 | Henze | 455/45 X |
| 5,406,626 | 4/1995 | Ryan | 380/9 |
| 5,444,312 | 8/1995 | Noblett et al. | 327/552 |
| 5,448,750 | 9/1995 | Eriksson et al. | 455/33.1 |
| 5,452,289 | 9/1995 | Sharma et al. | 370/32.1 |
| 5,467,087 | 11/1995 | Chu | 354/51 |
| 5,491,837 | 2/1996 | Haartsen | 455/62 |
| 5,493,709 | 2/1996 | Duckeck et al. | 455/186.1 X |
| 5,524,051 | 6/1996 | Ryan | 380/9 |
| 5,584,051 | 12/1996 | Goken | 455/45 X |
| 5,590,195 | 12/1996 | Ryan | 380/9 |
| 5,600,573 | 2/1997 | Hendricks et al. | 364/514 |
| 5,649,319 | 7/1997 | Kimura et al. | 455/186.1 |
| 5,659,877 | 8/1997 | Enomoto et al. | 455/4.1 |

FOREIGN PATENT DOCUMENTS

| | | |
|---|---|---|
| 0 552 051 A2 | 7/1993 | European Pat. Off. |
| 2651352 A2 | 3/1991 | France . |
| 4024132A1 | 2/1993 | Germany . |
| 2260879 | 4/1993 | United Kingdom . |
| WO 87/04309 | 7/1987 | WIPO . |
| WO 89/01429 | 2/1989 | WIPO . |

OTHER PUBLICATIONS

Russ Lockwood, "FM sidebands: tuning in to Wall Street," *Personal Computing,* Apr. 27, 1990, vol. 14, No. 4, p. 80(5).

Daniel Kumin, "RBDS Radios on the Way, But Most Suppliers Cautious," *Twice,* Jan. 4, 1993, p. 109.

Mark Fleischmann, "Now it's digital FM radio. (The Digital Age Comes Home)," *Popular Science,* November 1990, vol. 237, No. 5, pp. 77(3).

Paul Rocheleau, *Radio on Wheels* (book reviews).

| BYTE 1, CHANNEL NUMBERS | BYTE 2, PRIORITY | |
| --- | --- | --- |
| 8 bits, 256 Combinations | 4 bits, 16 priorities | 4 bits (unused) |

FIG. 3

METHOD AND APPARATUS FOR TRANSMITTER IDENTIFICATION AND SELECTION FOR MOBILE INFORMATION SIGNAL SERVICES

BACKGROUND OF THE INVENTION

The present invention relates to the reception of information signals in a moving vehicle and, more particularly, to the reception of audio or video information transmitted from different sites within a respective service area or areas, wherein the same information signal is transmitted by the transmitters using different frequency channels.

The most common form of receiving broadcast entertainment and/or informative audio and video programming is through the medium of AM and FM radio, and VHF and UHF television, broadcasting and receiving respectively, in which the audio and/or video materials received are precisely the materials which are being broadcast at the time of reception. In these well known real time audio and video transmitter/receiver systems, the recipient has no choice but to accept whatever entertainment or informative program materials are selected for transmission, along with any program supporting message materials such as commercials, announcements and other related messages which the broadcaster or originator chooses to include with the program materials.

A more recent medium for receiving informative materials, primarily in an alphanumeric format is, for example, a FM radio sideband system which broadcasts to dedicated portable devices or computers which are adapted with special FM receivers and software. The materials are transmitted in digital format, received, and stored in a memory for subsequent access by the user using menu driven software and generally are utilized by being displayed on a self contained visual screen or computer monitor in conventional alphanumeric format. Software provided with the program materials by the originator allows the user to scan the incoming materials and to transfer to memory or display the materials which meet the subscriber/user desired parameters.

The typical broadcast radio and television transmission systems of previous mention employ VHF bands I, II, III, and the UHF bands IV and V and can supply other information signals in addition to the primary entertainment material. The information signals are intercepted by specialized receivers designed for that particular application. The signals are time division multiplexed (TDM) during the non-picture periods of a television signal or frequency division multiplexed (FDM) with transmitted FM radio signals. These supplementary signals usually are sent from one transmitter to a multitude of fixed receiving sites located entirely within the service area of the transmitter, wherein a service area is the area surrounding a transmitter over which the respective signal is radiated and may be faithfully received. It follows that the information signals can be received in a moving vehicle only if the vehicle remains within the service area and the reception within the service area is not obstructed.

Another medium for receiving information is by wireless telephony of which the well known cellular phone system is the most common application. In this medium, the telephone user not only receives information but also sends information in real time and the telephone may be mobile and thus useable to receive and send in and from a moveable vehicle. To be effective such a system is a two-way system operating in real time. That is, the user transmits information as well as receives information. The loss of some information is not critical since any lost conversation may be readily repeated, unlike a non-real time system wherein information may be stored for later use.

In a recently developing field, audio and video entertainment and/or informative information is transmitted and received in unique fashion by selectively delivering the information in real time to a multitude of receivers for storage. The stored information subsequently is retrieved by a user at his or her convenience in non-real time. Such a unique entertainment system is described for example in the U.S. Pat. No. 5,406,626 issued Apr. 11, 1995 and U.S. Pat. No. 5,524,051 issued Jun. 4, 1996, and U.S. Pat. No. 5,590,195 issued Dec. 31, 1996 in the U.S. application Ser. No. 08/627,947 filed Apr. 3, 1996 now U.S. Pat. No. 5,809,472 issued Sep. 15, 1998, and Ser. No. 08/664,290 filed Jun. 11, 1996 now U.S. Pat. No. 5,815,671 issued Sep. 29 1998, the contents of which are incorporated by reference herein.

Such a unique entertainment programming system particularly is adaptable for use with moving vehicles, that is, with receivers located in moveable vehicles, wherein the user or driver in the vehicle may access the stored entertainment or informative information at a convenient time. However, as mentioned above, the mobile receivers must have access to the transmitted information regardless of the extent of travel of the respective vehicles.

It follows therefore, that in such mobile reception applications, diverse transmission of the information signals is necessary to guarantee reception within each and every service area. If the signal from one transmitter is lost, the receiver must automatically search for another transmission source by scanning every channel within the frequency band until one is found carrying the same information signals. As the number of possible channels is large, it could take a long time for the receiver to search for the next available channel, during which time much information is lost. In addition, if there are multiple sources available, the receiver usually will accept the first signal transmission found regardless of whether it is the optimum transmission for the location of the receiver.

Accordingly, in the unique information/entertainment programming system of last mention, it would be highly desirable to provide a diverse multiple transmitter network and associated transmitter locating system whereby uninterrupted information signals may be received by a receiver in a moving vehicle while the vehicle is traveling within a service area or across a boundary into other service areas.

SUMMARY OF THE INVENTION

The present invention provides the desirable features of previous mention by enabling the uninterrupted detection and thus selection of successive transmitter sites by a mobile receiver as a vehicle and its associated receiver travel within a transmitter service area or through a succession of service areas, wherein each selected transmission site radiates the same information signal on a different carrier frequency, i.e., channel. It follows that the invention provides a technique for the reception of information signals in the form of transmitted digital data, in a vehicle which is traveling through extended distances, with a minimum interruption of service and consequent loss of information.

To this end, the auxiliary space or frequency spectrum available in conventional broadcast television signals or FM radio signals is used to deliver information/data from fixed points, the transmitter sites, to a multitude of receivers, wherein the same information/data for all transmitter sites is originated at a central location. This available transmission capacity is used for the entertainment programming service specifically configured for drivers and passengers in moveable vehicles, as described in the U.S. Pat. No. 5,406,626. The signals are digital data signals representing audio and/or video programs and are transmitted from one or more transmitters in a particular area. In general practice, 100 channels are available if the FM band (88 MHz to 108 MHz) is used and the United States channel spacing standard of 200 kHz is applied. The number of channels in any area is dependent upon the population density of that area. In a large metropolitan area, 30 transmission channels are not uncommon.

Within a service area, one or more transmitters are provided which carry the identical information signal on different frequency channels. In an adjacent service area, additional transmitters serving that area provide the service. As with any digital transmission scheme, additional data space must be allocated to carry further ancillary information to enable recovery of the desired data. The ancillary information includes codes which identify the program material available to a specific receiver.

To this end, in accordance with the invention, a unique transmitter location code is included within the additional data space and is transmitted at regular intervals together with the other ancillary information. A unique transmitter location code is assigned to each transmitter and thus to a corresponding transmitter site, and the location code is multiplexed in the ancillary data and combined with the information signals being radiated over the associated service area. More particularly, by way of example, a two byte word is added to the information signal at each transmitter site which provides the information programming service. The first byte of for example eight bits contains in a converted binary format the channel number or numbers of the transmitter or transmitters within a given service area providing the service. The first byte thus defines the transmitting frequencies of all FM and television channels in the VHF and UHF bands. The second byte of the two byte code comprises for example four bits and contains the priority of each transmitter wherein the highest powered transmitter is assigned a first priority for search by the receivers. Other transmitter sites in the same service area are assigned priorities of descending order commensurate with their descending order of radiating power. The priority list for a service area also includes codes for transmitter sites or stations in neighboring overlapping service areas. In the exemplary second byte of description herein, up to sixteen station priorities are provided by way of example only.

In a typical application, the two byte word of the transmitter location code is appended once every sixteen seconds to the information signal being radiated. The precise time of day is not critical. The two byte words of a service area and of neighboring overlapping service areas comprise a list of location codes containing the code for each transmitter site. The list of location codes is stored in a known location in a non-volatile memory in the receiver together with the program information and other ancillary data, whereby the two byte word is available for subsequent retrieval and analysis to determine the preferred transmitter for the moving receiver. Examples of the memory and receiver, and the manner of storage and retrieval of the information, the ancillary data and thus of the two byte code, is illustrated below and further depicted in the related patents/applications of previous mention.

BRIEF DESCRIPTION OF THE DRAWINGS

FIG. 3 is a timing diagram illustrating a transmitter location code of two bytes, in accordance with the invention.

DESCRIPTION OF THE PREFERRED EMBODIMENTS

Figure 1:
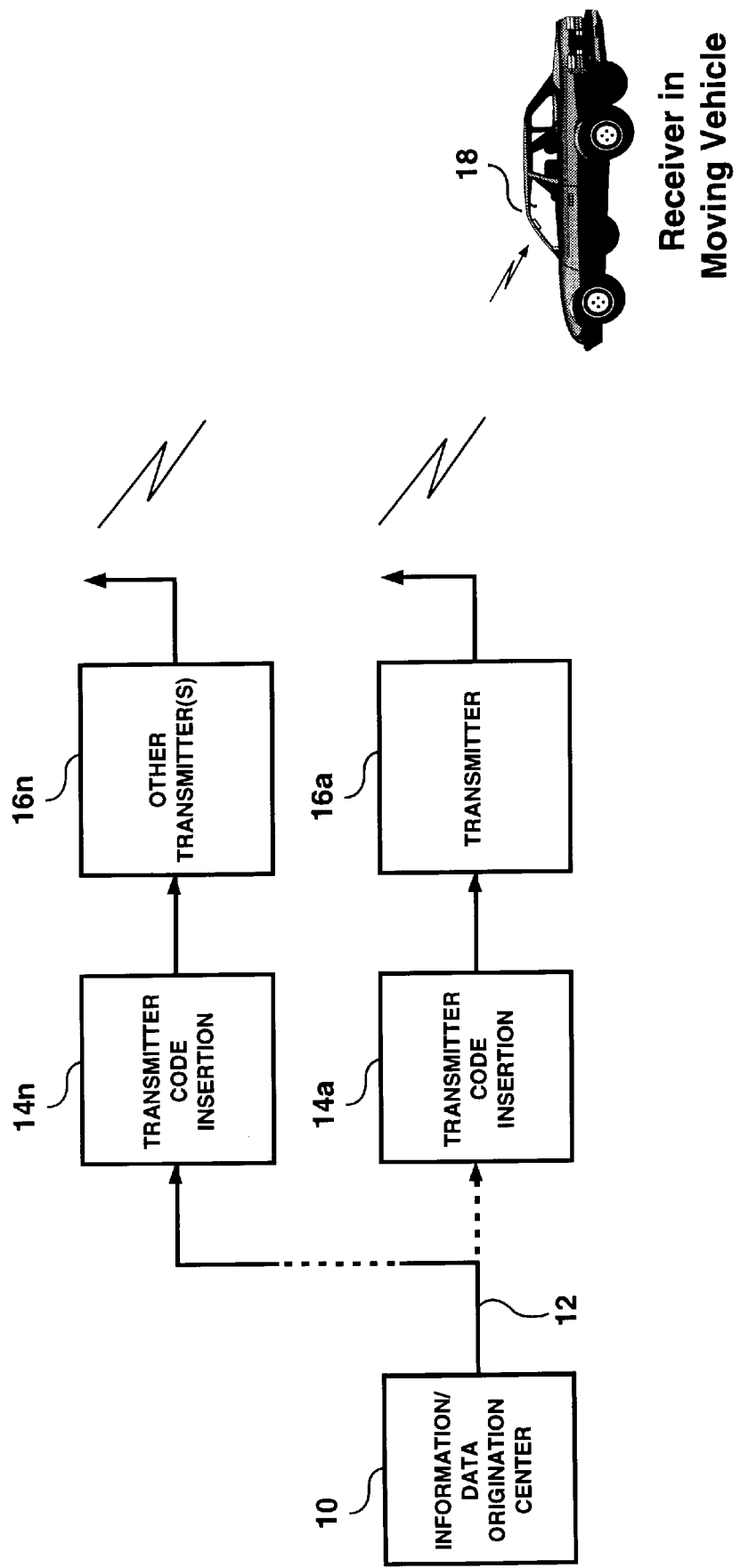
FIGS. 1 and 2 are block diagrams depicting transmitter and receiver systems which form the environment in which the present invention is employed.
Figure 2:
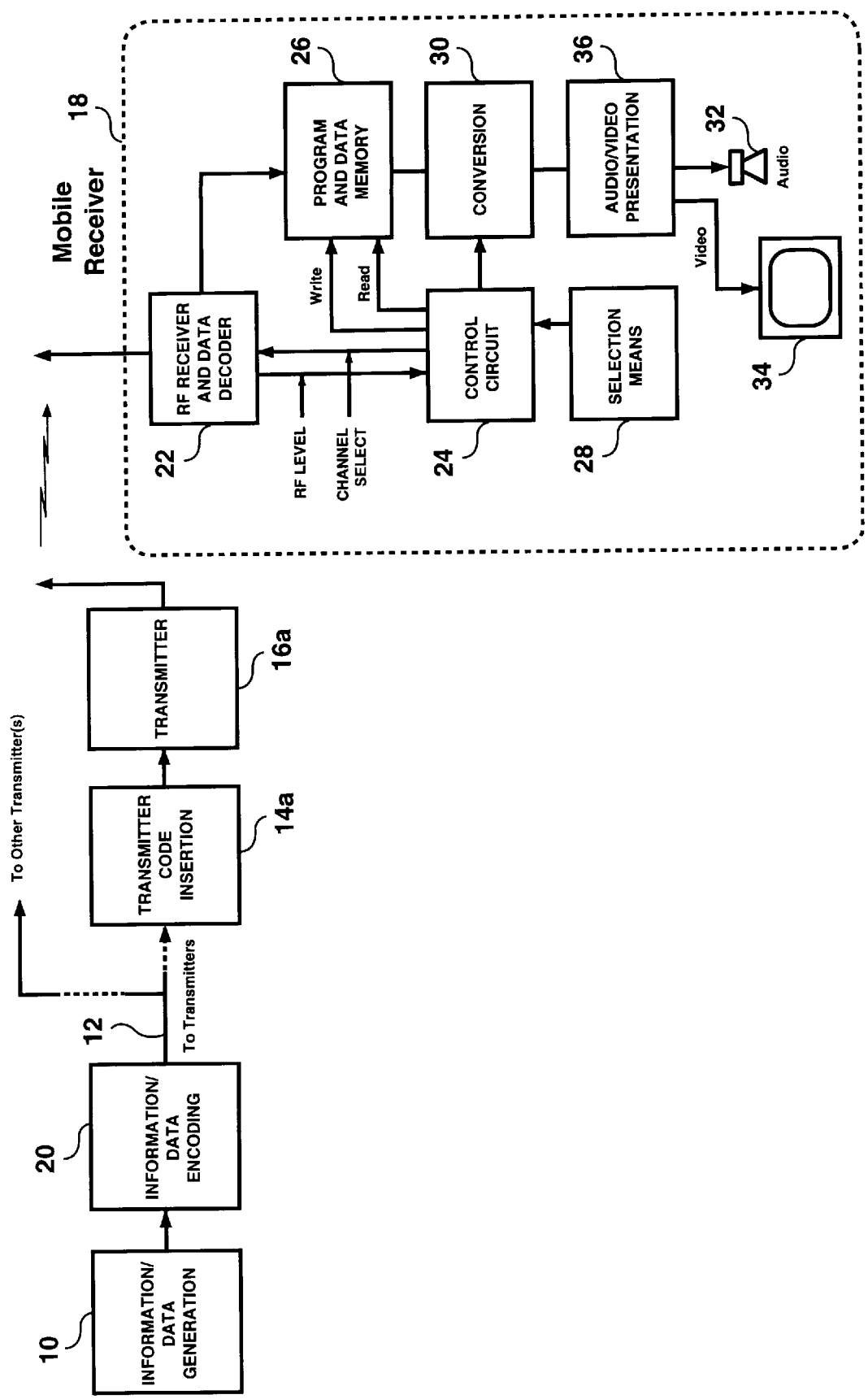

FIGS. 1 and 2 illustrate apparatus for transmitting and receiving the entertainment and/or informative programming services of previous discussion, wherein the apparatus includes the multiple transmitter sites and associated service areas and wherein the present invention is employed to locate and select the optimum transmitter sites as a receiver travels through successive service areas. Briefly, in FIG. 1, program information and ancillary data such as advertising, announcements, etc., are gathered and/or generated and are encoded at a program origination center 10 located, for example, somewhere in the United States. The encoded signals then are distributed to a multiplicity of radio or television transmitter sites located throughout the country. To this end, the assembled and encoded information are supplied, via a common carrier path 12 such as land lines, satellite, etc., to respective transmitter code insertion circuits 14a–14n, wherein the identification code for each transmitter site is inserted in the ancillary data. The program origination center 10 includes circuits for providing the ancillary data, and the code insertion circuits 14a–14n insert the respective transmitter location code for each transmitter in accordance with the present invention, into the respective encoded information. The combined information and ancillary data are supplied to transmitters of transmitter sites 16a–16n for radiation over their associated service areas, and for reception by mobile receivers located in respective moving vehicles as depicted at 18. In an alternative configuration, the insertion circuits 14a–14n can be located in the center 10 and separate transmission paths 12 then are provided to each transmitter site 16a–16n.

FIG. 2 includes further block details of the apparatus of FIG. 1, and depicts the program origination center 10 as further including a generally conventional data encoding circuit 20. The same combined encoded signal is supplied via the transmission paths 12 to one or more transmitters of transmitter sites 16a–16n via respective code insertion circuits 14a–14n, for transmission on individual frequency channels.

As illustrated in FIG. 2, the receiver 18 includes the usual antenna to enable receiving the transmitted encoded signal, coupled to an RF receiver circuit and data decoder circuit as indicated at 22. A control circuit 24, which includes a suitable processor, receives an automatic gain control (AGC) voltage, depicted here as an RF level signal, from the circuits 22 via a lead 23 and returns a receiver channel select signal thereto via a lead 25. The control circuit 24 further supplies write and read signals to a program information/data memory 26, which receives the decoded program information/data signal from the circuits 22 in response to the write signal. At such time as directed by the user via input to a selection means 28, the control circuit 24 supplies the read signal to the memory 26 to enable retrieval of desired stored program information, which is converted in D/A converter 30 under control of a signal from the control circuit 24. The analog version of the program information is supplied as an audio signal to a suitable speaker 32 and the like, or as a video signal to a suitable monitor 34 and the like, via an audio/video amplifying circuit 36.

The receiver 18 includes the memory 26 for selectively storing the program information and the ancillary data, and the receiver/decoder circuit 22 for detecting the two byte word corresponding to the transmitter location code to enable the receiver 18 to lock on to the optimum transmitter 16a–16n, as further described below in FIG. 5.

FIG. 3 illustrates an embodiment of a transmitter location code formed of a first byte 1 and a second byte 2 of a two byte word which, as previously mentioned, is added to the information program as part of the ancillary data. As depicted, the byte 1 contains the channel numbers of the stations within a service area while the byte 2 contains the priority order corresponding to the highest to the lowest powered transmitter. A priority list includes the codes of transmitter sites in neighboring overlapping service areas. The combined location codes comprise a list of codes wherein each code is transmitted by the respective transmitter and the combined list of codes is received and stored by the receiver or receivers in the service area. As depicted, the byte 1 of the binary two byte word provides 256 combinations, whereby the byte 1 uniquely defines the transmitting frequencies for example of all 100 FM channels and of the 82 television channels in the VHF and UHF frequency bands. The first four bits of the byte 2 define the priority of each transmitter, and provide up to sixteen priorities in the example herein. The remaining four bits are unused and thus are spares.

When a receiver is activated, reception commences on the channel last received. As the vehicle moves within the service area, if a loss of the RF level signal on the lead 23 from the receiver/decoder circuits 22 is experienced as measured by the value of the automatic gain control (AGC) voltage (or for digital data a sudden increase in the error rate of received raw data before error correction), the control circuit 24 directs the receiver via the receiver channel select signal on the lead 25 to select the highest priority channel number for the area from the list of transmitter location codes previously stored in memory. If the signal level of the received signal is satisfactory, the receiver stores the information program. If the signal is not satisfactory, the receiver tries the next highest priority channel number. The selection continues down the priorities until a satisfactory signal is received. Thus the receiver 18 immediately selects the next good channel in the shortest time with minimum interruption to the service.

As the vehicle moves between one service area and the next, eventually all signals from the initial service area deteriorate. However, since the transmitters of the next service areas continuously are transmitting their respective codes once every sixteen seconds, the receiver likewise continuously is receiving and storing an updated list of location codes and respective priorities. Thus, the receiver continues scanning from the order determined by the updated priority list in the transmitter location codes until a strong signal is found, which signal is from the next service area. While driving in the new service area the receiver thus will eventually receive and store the new list of transmitter location codes containing the priorities of the transmitters in that and overlapping adjacent areas. The initial code is of no further use and may be discarded. There is however an advantage to retaining other lists of transmitter location codes as will be explained in an alternative embodiment discussed below.

Figure 5:
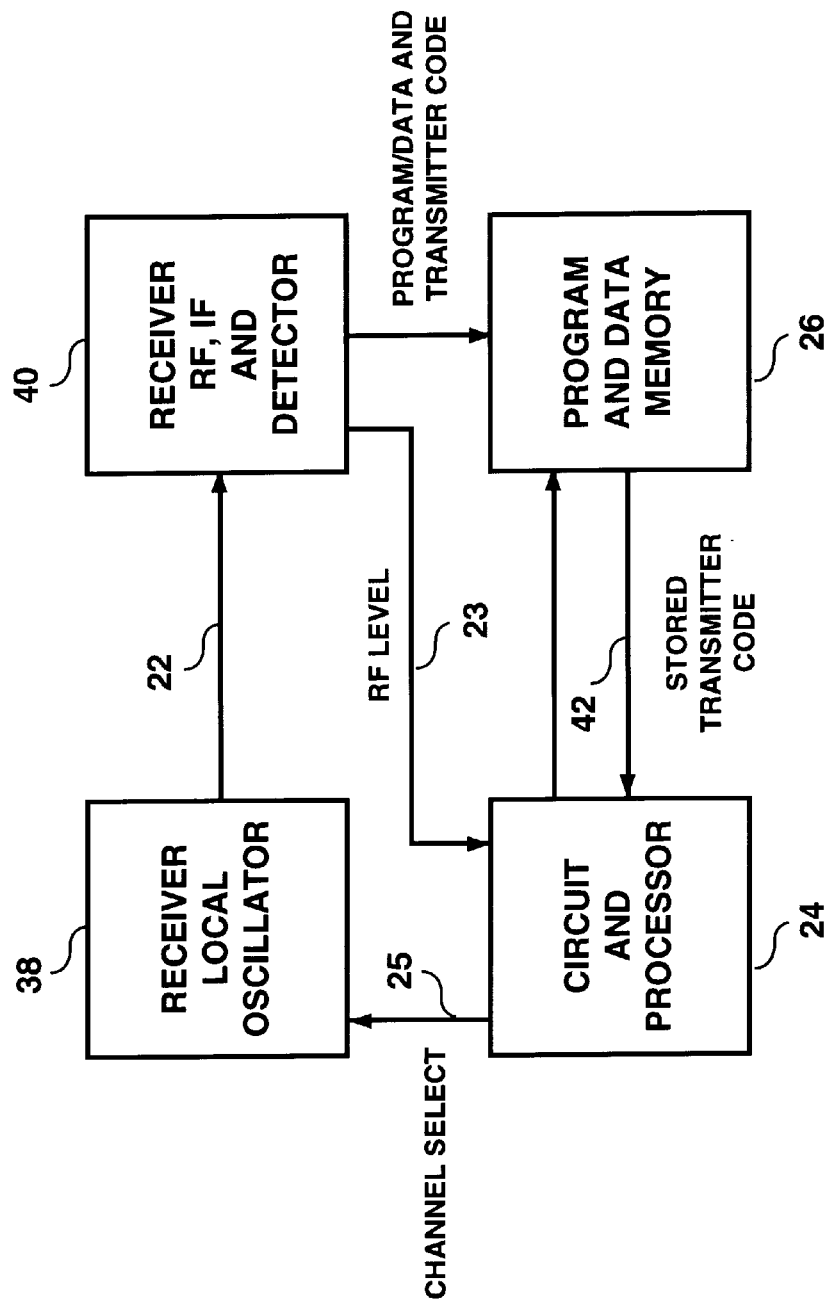
FIG. 5 is a block diagram depicting further details of the receiver of FIG. 2.

FIG. 5 depicts further details of the circuits 22, the memory 26 and the control circuit 24. The circuits 22 include a receiver local oscillator 38 and a receiver RF, IF and detector circuits 40 which receives the transmitted program and data signal. The program and data, including the transmitter location code, is supplied to the memory 26 which, in turn, is coupled to the control circuit 24 which includes the processor of previous mention. The transmitter code containing the list of transmitters in a service area and neighboring service areas are transmitted at regular intervals and stored in a dedicated memory location in the memory 26 of the receiver 18. The code contains the priority the receiver should follow when the received signal strength as indicated by the receiver AGC voltage or data error rate decreases below a selected threshold level required for reliable data recovery.

In a typical application, when the AGC voltage on lead 23 decreases below the threshold level, an interrupt is generated instructing the processor in the control circuit 24 to initiate a transmitter search routine. The routine commences by retrieving the transmitter code via a lead 42 and determining which is the next transmitter in the service area or neighboring overlapping area to be selected. The code contains the channel number of the transmitter required and the routine instructs the receiver local oscillator 38 to tune to the frequency to receive that transmitter. If the measured AGC voltage is adequate, the receiver remains tuned to that transmitter. If not, the routine selects the next transmitter on the priority list. The routine continues until a transmitter with adequate signal strength is located, as indicated by the AGC voltage.

During the transmission from the selected transmitter, a new transmitter code is received from the RF, IF and detector circuits 40, and is stored in the memory 26, replacing the transmitter code from the previous transmission.

Figure 4:
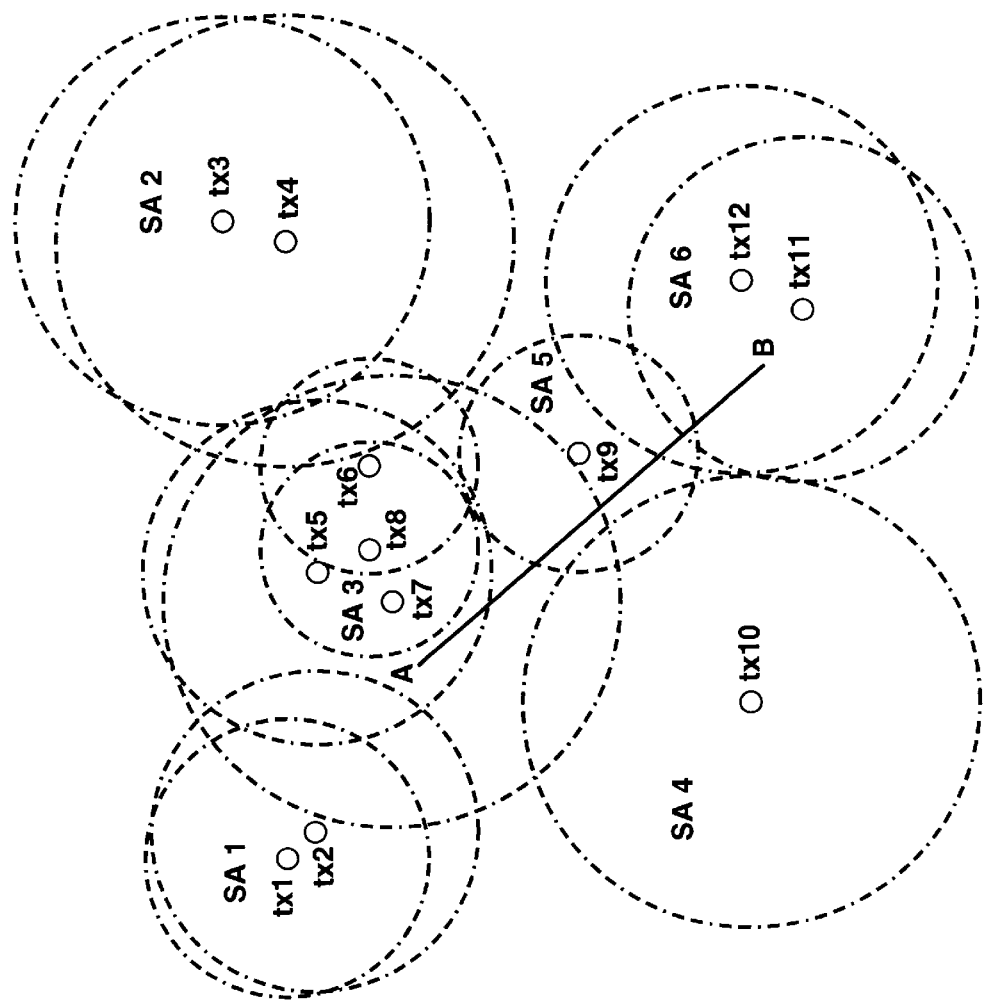
FIG. 4 is a map illustrating by way of example a plurality of service areas depicting the location and overlapping radiating coverage of respective transmitters in, for example, a metropolitan area and further illustrating the process of selecting optimum transmitters as a vehicle passes through consecutive service areas.

FIG. 4 illustrates in further detail the process of detecting and selecting optimum transmitters as a vehicle and its receiver travel through a succession of service areas and a respective plurality of transmitter sites. To this end, a vehicle starts at point A in service area 3 (SA 3) and continues to point B in service area 6 (SA 6), whereby the vehicle also travels through service area 5 (SA 5). As depicted by way of example herein, the service area SA 3 contains four FM broadcast transmitters tx 7, tx 5, tx 6 and tx 8 in order of descending transmitter power and thus in descending priority. Service area SA 5 contains a single transmitter, tx 9 and SA 6 contains two transmitters, tx 12 and tx 11. The transmitter location codes for SA 3 is shown in Table 1, which shows transmitter tx 7 as having the most power and most coverage in SA 3, 100 kilowatts (kW), and tx 3 in the adjacent SA 2 having the high power, 50 kW, but least coverage in SA 3. If the vehicle is starting at point A, it is assumed that the transmitter location code for SA 3 is stored in the receiver memory from the previous use.

Regarding FIG. 4, it is assumed that at the start of the vehicle journey, point A, the receiver 18 is tuned to tx 5 selected at the end of the previous journey and use. As the journey progresses to the border of the coverage of tx 5, the receiver will re-tune to the highest priority transmitter on the list for SA 3, shown to be tx 7 in Table 1. As previously mentioned, Table 1 depicts the transmitter sites of SA 3 and of overlapping adjacent service areas in descending order of priority, while further depicting the effective radiated power (ERP) of each transmitter. Tx 7 covers the upper 40% of SA 5. When the signal decreases from that transmitter, the receiver will find tx 9 after the sixth try. During the journey through SA 5 a new list of transmitter location coded will be received replacing the current list of codes.

TABLE 1

Transmitter Location Codes for Service Area 3

| Transmitter Number | Priority | Location | ERP |
|---|---|---|---|
| 7 | Highest | SA 3 | 100 kW |
| 5 | ↓ | SA 3 | <100 kW |
| 6 | ↓ | SA 3 | >10 kW |
| 8 | ↓ | SA 3 | 10 kW |
| 2 | ↓ | SA 1 | 50 kW |
| 4 | ↓ | SA 2 | 75 kW |
| 9 | ↓ | SA 5 | 20 kW |
| 10 | ↓ | SA 4 | 100 kW |
| 1 | ↓ | SA 1 | 30 kW |
| 3 | Lowest | SA 2 | 50 kW |

To this end, the transmitter location codes for SA 5 are shown in Table 2. The highest priority is assigned to tx 9, the only one in the area SA 5. The remaining priorities in Table 2 are based on the percentage of coverage offered by neighboring overlapping transmitters in the other service areas SA 3, SA 4 and SA 6.

TABLE 2

Transmitter Location Codes for Service Area 5

| Transmitter Number | Priority | Location | ERP |
|---|---|---|---|
| 9 | Highest | SA 5 | 20 kW |
| 7 | ↓ | SA 3 | 100 kW |
| 12 | ↓ | SA 6 | 70 kW |
| 10 | ↓ | SA 4 | 100 kW |
| 11 | ↓ | SA 6 | 30 kW |
| 6 | ↓ | SA 3 | >10 kW |
| 3 | Lowest | SA 3 | 10 kW |
| 8 | | SA 3 | 50 kW |

When the vehicle reaches the boundary of SA 5 and the signal from transmitter tx 9 decreases, the search for a new transmitter commences with transmitter tx 7 (from Table 2) then to transmitter tx 12. The receiver 18 will remain tuned to tx 12 for the remainder of the journey to point B. The transmitter location codes for SA 6 lists the transmitters in the order from highest to lowest priority as for example, tx 12, tx 11, tx 9 and tx 10. The service area SA 6 codes would be the last stored in the receiver at such time as the vehicle and/or the receiver is shut down.

The priority of transmitters in a particular service area is determined by the area within their individual contour curves of FIG. 4 with the highest priority given to the largest area. The area is usually proportional to transmitter power and height of the transmitting antenna above the terrain of the service area. The priority of neighboring service area transmitters into the initial service area is determined by the area within their contour curves that extends into the contour curve of the current transmitter of the initial service area.

The transmitter location codes usually are fixed but may from time-to-time be updated to correct transmission conditions, thereby accommodating such changes as change of transmitter powers (priority) or change of transmitter allocation (channel number). Since the receiver is updated regularly it is immune to these in-service changes.

The previous discussion indicates that the receiver 18 need only have the transmitter location codes updated once while a vehicle is in a particular service area since the priority coding of the transmitters covers that service area and the boundaries of neighboring areas. As an alternative, the service can be enhanced by storing more than one list of transmitter location codes in the memory 26. As each new code list is received the current code list is pushed into a stack memory as represented by memory 26. When on the boundary of a transmission in one service area, the receiver selects the next signal from the priority list of that service area. Once selected, the receiver then examines the stored transmission location codes off-line to find the code in which the selected channel has the highest priority. That code is a good indication that the vehicle is in that service area. The stored service area codes then replace the current service area codes, and the replaced current service area codes are moved into the stack memory. Thus the receiver 18 does not have to wait for a transmission of a transmitter locator code to determine the current service area in which the vehicle is traveling, if the vehicle has in the past, traveled in the service area.

The transmitter location code normally is inserted at the transmitter site or in the signal supplied to the transmitter site, as depicted in FIGS. 1, 2. From time to time the transmitters selected for the service within a service area may change, as would be the case when leases expire or the service were expanded. With this type of operation central electrical distribution of transmitter codes is desirable, with all transmitter codes maintained and updated from a single location for the common broadcast service. Each local transmitter code inserter (14a–14n) thus monitors the incoming data and responds appropriately to a change of transmitter code priority.

Although the invention has been described herein relative to specific embodiments, various additional features and advantages will be apparent from the description and drawings, and thus the scope of the invention is defined by the following claims and their equivalents.

What is claimed is:

1. Apparatus for selecting a transmitter within a service area from multiple transmitters while moving a receiver within a given service area or between neighboring overlapping service areas, wherein each transmitter broadcasts the same information signal with a respective effective radiating power, comprising:

means in each transmitter for generating the same information signal on a respective frequency channel together with a transmitter location code indicative of the respective transmitter;

means responsive to the generating means for inserting in the information signal at selected time intervals the transmitter location code of the respective transmitter, wherein the transmitter location code further includes a first digital word indicative of a priority of the respective transmitter in the given service area and the neighboring overlapping service areas; and means in the receiver for selecting via the transmitter location code the transmitter which broadcasts the optimum information signal and, for storing an optimum information signal for subsequent use.

2. The apparatus of claim 1 wherein the transmitter location code further includes:

a second digital word indicative of a channel number of the respective transmitter within the given service area and the neighboring overlapping service areas.

3. The apparatus of claim 2 wherein the inserting means includes:

a transmitter code insertion circuit in a respective transmitter for receiving the respective location codes of the first and second digital word from the generating means and for inserting the first and second digital words for transmission with the information signal.

4. The apparatus of claim 2 wherein said first digital word is indicative of transmitter priorities in terms of effective radiating power.

5. The apparatus of claim 1 wherein the selecting means includes:

a decoder for detecting the transmitter location codes inserted in the information signal by the respective transmitters; and means responsive to the decoder for selecting the transmitter with the optimum transmitted information signal for reception and storage for said subsequent use.

6. The apparatus of claim 5 including:

an RF receiver receiving the information signal for providing an RF level signal indicative of the transmitted signal strength; and control means responsive to the RF level signal for supplying a channel select signal to the RF receiver when the transmitted signal strength decreases to a selected minimum to cause the selecting of the next optimum transmitter.

7. The apparatus of claim 5 including:

a memory for storing the information signal for the subsequent use and also the transmitter location codes for the transmitters in the given service area and in the neighboring overlapping service areas.

8. The apparatus of claim 7 wherein:

the memory is a stack memory storing multiple location codes for the given service areas and the neighboring overlapping service areas.

9. A method of selecting via a receiver a transmitter from a plurality of transmitters each of which broadcasts an information signal to given and neighboring overlapping service areas, wherein the receiver is moving within the given service area or through the neighboring overlapping service areas, comprising:

transmitting the same information signal from the plurality of transmitters over respective frequency channels;

assigning an identification signal to each transmitter, wherein the identification signal includes a first digital code that identifies a priority of each transmitter within the given service area and the neighboring overlapping service areas;

detecting the identification signal of a preferred transmitter which is broadcasting an optimum information signal over the respective frequency channel; and receiving the optimum information signal from the preferred transmitter for subsequent use.

10. The method of claim 9 wherein the assigning further includes:

identifying by the identification signal each transmitter within the given service area and the neighboring overlapping service areas by a second digital code indicative of each transmitter channel number.

11. The method of claim 10 wherein:

the detecting further includes decoding the first digital code to determine the preferred transmitter in the given service area and the neighboring overlapping service areas; and the receiving further includes storing the optimum information signal for the subsequent use.

12. The method of claim 11 wherein the detecting includes determining if the transmitted information signal level decreases to a selected minimum and, if so, repeating the detecting to locate a next preferred transmitter.

13. The apparatus of claim 10 wherein said first digital word is indicative of transmitter priorities in terms of effective radiating power.

14. A method of selecting via a receiver a transmitter from a plurality of ransmitters each of which broadcasts an information signal to given and neighboring overlapping service areas, wherein the receiver is moving within the given service area or through the neighboring overlapping service areas, comprising transmitting the same information signal from the plurality of transmitters over respective frequency channels;

assigning an identification signal to each transmitter, wherein the assigning further includes identifying each transmitter within the given service area and the neighboring overlapping service areas by a digital code indicative of each transmitter channel number and priority of effective radiating power;

detecting the identification signal of a preferred transmitter which is broadcasting an optimum information signal over the respective frequency channel;

receiving the optimum information signal from the preferred transmitter for subsequent use;

storing the digital codes of the transmitters in the given service area and the neighboring overlapping service areas; and scanning the stored digital codes beginning with a code of highest priority until the preferred transmitter broadcasting the optimum information signal is located.

15. A method of selecting via a mobile receiver a transmitter from a plurality of transmitters each of which broadcasts an information signal over a given and neighboring overlapping services areas, comprising:

transmitting from each transmitter to the service areas the same information signal over respective different frequency channels including a transmitter location code identifying each transmitting channel and priority of each transmitter;

detecting via the mobile receiver in the given service area the location code of a preferred transmitter which is transmitting the strongest information signal in the given service area; and storing in the mobile receiver the strongest information signal from the preferred transmitter for subsequent use.

16. The method of claim 15 wherein the step of transmitting includes the step of:

generating for transmission the transmitter location code in the form of a digital code identifying each transmitter frequency channel and its order of priority of effective radiating power.

17. The method of claim 15 further including:

moving the mobile receiver through the given service area or into the neighboring overlapping service area;

determining if the strength of the transmitted information signal decreases to a selected minimum causing loss of signal reception; and upon the loss, repeating the detecting the location code of a next preferred transmitter in the given service area or the neighboring overlapping service area to restore reception of the information signal.

18. The method of claim 17 including:

storing combined location codes for the transmitters in the given service area and the neighboring overlapping services areas;

upon movement of the mobile receiver into a new given service area, storing new combined location codes for the new given service area and neighboring overlapping service areas and stacking the previous combined location codes in memory for use when the mobile receiver returns to the previous given service area.

19. A method of selecting via a mobile receiver a transmitter from a plurality of transmitters each of which broadcasts an information signal over a given and neighboring overlapping services areas, comprising:

transmitting from each transmitter to the service areas the same information signal over respective different frequency channels including a transmitter location code identifying each transmitting channel, wherein the transmitting further includes generating for transmission the transmitter location code in the form of a digital code identifying each transmitter frequency channel and its order of priority of effective radiating power;

detecting via the mobile receiver in the given service area the location code of a preferred transmitter which is transmitting the strongest information signal in the given service area;

storing in the mobile receiver the strongest information signal from the preferred transmitter for subsequent use;

storing combined location codes for the transmitters in the given service area and in neighboring overlapping service areas; and performing the step of detecting by searching the stored combined location codes in order of highest to lowest priority thereby to hasten selection of the preferred transmitter.

20. A receiver for selecting a transmitter within a respective service area from multiple transmitters while moving the receiver within a given service area or between neighboring overlapping service areas, wherein each transmitter broadcasts the same information signal with a respective effective radiating power, on a respective frequency channel together with a transmitter location code that includes a priority of the respective transmitter; and each transmitter includes circuitry for inserting in the information signal at selected time intervals the transmitter location code of the respective transmitter; and the receiver selects via the transmitter location code the transmitter which broadcasts the optimum information signal, and stores the optimum information signal for subsequent use.

21. The receiver of claim 19 wherein the receiver includes:

a decoder for detecting the transmitter location codes inserted in the information signal by the respective transmitters; and circuitry responsive to the decoder for selecting the transmitter with the optimum transmitted information signal for reception and storage for the subsequent use.

22. The receiver of claim 21 including:

an RF receiver for receiving the information signal and providing an RF level signal indicative of the transmitted signal strength; and a control circuit responsive to the RF level signal for supplying a channel select signal to the RF receiver when the transmitted signal strength decreases to a selected minimum to cause the selecting of the next optimum transmitter.

23. The receiver of claim 21 including:

a memory for storing the information signal for the subsequent use and also the transmitter location codes for the transmitters in the given service area and in the neighboring overlapping service areas.

24. The receiver of claim 23 wherein:

the memory is a stack memory for storing multiple location codes for the given service area and the neighboring overlapping service areas.

25. The receiver of claim 20 wherein the transmitter location code includes:

a digital word indicative of a channel number of the respective transmitter within the given service area and the neighboring overlapping service areas.

26. The apparatus of claim 25 wherein the circuitry for inserting includes:

a transmitter code insertion circuit in a respective transmitter for receiving the respective location codes of the first and second digital word from the transmitter and for inserting the first and second digital words for transmission with the information signal.

27. The apparatus of claim 25 wherein said first digital word is indicative of transmitter priorities in terms of effective radiating power.

28. A receiver for selecting a signal among multiple signals, each signal including the same information content and including a priority code representing a priority of the signal in the given service area and the neighboring overlapping service areas, comprising:

a control circuit which selects the optimum information signal based on the priority codes and stores the optimum information signal for subsequent use.

29. The receiver of claim 28 further includes:

a decoder which detects the priority codes, wherein the control circuit is responsive to the decoder for selecting the optimum signal for reception and storage for the subsequent use.

30. The receiver of claim 29 including:

an RF receiver portion in the receiver which receives the information signal and provides an RF level signal indicative of the transmitted signal strength, wherein the control circuit is responsive to the RF level signal and supplies a channel select signal to the RF receiver portion when the transmitted signal strength decreases to a selected minimum to cause a selecting of the next optimum transmitter.

31. The receiver of claim 29 including:

a memory in the receiver which stores the information signal for the subsequent use and also the transmitter location codes for the transmitters in the given service area and in the neighboring overlapping service areas.

32. The receiver of claim 28 wherein each signal further includes:

a second digital word indicative of a channel number of the respective signal within the given service area and the neighboring overlapping service areas.

33. The receiver of claim 32 wherein said priority code is indicative of transmitter priorities in terms of effective radiating power.

34. A transmitter which generates signals, comprising:

a generator which generates an information signal on a frequency channel together with a transmitter location code indicative of the transmitter; and an insertion circuit responsive to the generator which insert in the information signal at selected time intervals the transmitter location code of the transmitter, wherein the transmitter location code further includes a first digital word indicative of a priority of the transmitter relative to other transmitters.

35. The transmitter of claim 34 wherein the priority is in an area which includes a given service area and neighboring overlapping service areas.

36. A method for generating signals, comprising:

generating an information signal on a frequency channel together with a transmitter location code indicative of the transmitter; and inserting in the information signal at selected time intervals the transmitter location code of the transmitter, wherein the transmitter location code further includes a first digital word indicative of a priority of the transmitter relative to other transmitters.

37. The method of claim 36 wherein the priority is in an area which includes a given service area and neighboring overlapping service areas.

* * * * *

UNITED STATES PATENT AND TRADEMARK OFFICE
CERTIFICATE OF CORRECTION

PATENT NO. : 5,956,629 Page 1 of 1
DATED : September 21, 1999
INVENTOR(S) : Eric Fraser Morrison It is certified that error appears in the above-identified patent and that said Letters Patent is hereby corrected as shown below:

Column 10,
Line 4, cancel "word" and substitute -- code --.
Line 7, cancel "ransmitters" and substitute -- transmitters --.

Column 11,
Line 48, cancel "claim 19" and substitute -- claim 20 --.

Column 12,
Line 18, cancel "first and second digital words" and substitute -- digital word --.
Line 20, cancel "first".
Line 54, cancel "second".
Line 65, cancel "insert" and substitute -- inserts --.

Signed and Sealed this

Twenty-sixth Day of August, 2003

JAMES E. ROGAN
*Director of the United States Patent and Trademark Office*